United States Patent
Hays

Patent Number: 5,889,162
Date of Patent: Mar. 30, 1999

[54] STRONG GREEN-SHADE YELLOW DISAZO PIGMENT

[75] Inventor: Byron G. Hays, Chagrin Falls, Ohio

[73] Assignee: Engelhard Corporation, Iselin, N.J.

[21] Appl. No.: 131,719

[22] Filed: Aug. 10, 1998

[51] Int. Cl.$^6$ .......... C09B 33/153; C09B 41/00; C09B 67/20; C09D 11/00

[52] U.S. Cl. .......... 534/581; 534/748; 106/31.81; 106/496; 524/190

[58] Field of Search .......... 534/748, 581; 106/31.81, 496; 524/190

[56] References Cited

U.S. PATENT DOCUMENTS

| | | | |
|---|---|---|---|
| 3,719,658 | 3/1973 | Conley | 534/748 |
| 3,872,078 | 3/1975 | Cseh et al. | 534/748 |
| 3,978,038 | 8/1976 | Cseh et al. | 260/176 |
| 4,103,092 | 7/1978 | Jefferies et al. | 260/175 |
| 4,146,558 | 3/1979 | Jefferies et al. | 260/562 |
| 5,559,216 | 9/1996 | Jung et al. | 534/579 |
| 5,616,778 | 4/1997 | Goldmann et al. | 560/35 |
| 5,669,967 | 9/1997 | Hays | 106/496 |

FOREIGN PATENT DOCUMENTS

| | | |
|---|---|---|
| 495394 | 8/1953 | Canada .......... 534/745 |
| 1135688 | 11/1982 | Canada . |
| 2336915 | 7/1975 | Germany . |
| 1396526 | 6/1975 | United Kingdom . |
| 1400533 | 7/1975 | United Kingdom . |

OTHER PUBLICATIONS

Goldmann, Chemical Abstracts, 104:111353 (1986).
Aeberli et al., Chemical Abstracts, 86:157039 (1977).
Pribil et al., Chemical Abstracts, 96:70431 (1982).
Pribil et al., Chemical Abstracts, 96:53805 (1982).
Hunger, Chemical Abstracts, 95:82387 (1981).

*Primary Examiner*—Fiona T. Powers
*Attorney, Agent, or Firm*—Raymond F. Keller

[57] ABSTRACT

In one embodiment, the present invention relates to a green shade yellow pigment composition comprising a compound having the formula:

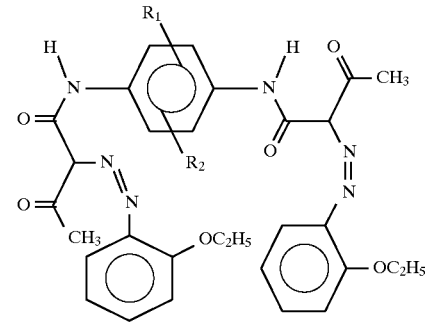

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl. The green shade yellow pigment composition is suitable for use in plastics, paints and inks.

24 Claims, No Drawings

STRONG GREEN-SHADE YELLOW DISAZO PIGMENT

TECHNICAL FIELD

This invention generally relates to novel green-shade yellow disazo pigments and to the use of such pigments in plastics, paints and inks.

BACKGROUND OF THE INVENTION

Azo yellow pigments are a class of colorants that are tinctorially strong and relatively inexpensive. Monoazo yellow pigments exhibit good lightfastness and are useful as coloring agents for paints and some printing inks. In plastics, however, monoazo yellow pigments tend to undesirably bloom and discolor at high temperatures, so their use is disfavored. Diarylide disazo yellow pigments, made from 3,3'-dichlorobenzidine, are much stronger tinctorially and show a much lower tendency to bloom and discolor at high temperatures. C.I. Pigment Yellow 17 is a strong green-shade diarylide yellow and has often been used for plastics. W. Herbst and K. Hunger, *Industrial Organic Pigments*, VCH, New York, 1993, p. 252, state: "The plastics industry, however, uses P.Y. 17 extensively, . . . P.Y. 17 is also frequently used in polyolefins . . . . Its heat stability in these media was said to be about 220° to 240° C." However, R. Az et al reported in *Dyes and Pigments*, 15, 1 (1991), that diarylide yellows are degraded to potentially carcinogenic by-products (e.g., 3,3'-dichlorobenzidine) in plastics processed above 200° C., a temperature lower than that used in processing most plastics (many plastics are processed at temperatures from 230° C. to 330° C.). In efforts to overcome these disadvantages, azo pigment manufacturers have actively pursued development of other types of azo yellows.

One alternative type of azo yellows include disazo yellow pigments made by coupling bis(acetoacetamido)benzenes (BAAAB) into aniline derivatives. U.S. Pat. No. 5,616,778 to Goldmann et al relates to coupling 1,4-BAAAB into 2,5-dicarbomethoxyaniline (to give C.I. Pigment Yellow 155) and heating the pigment in an organic solvent at 80°–150° C. for up to 6 hours. U.S. Pat. No. 5,559,216 to Jung et al gives 47 Examples and describes coupling 1,4-bisacetoacetamidobenzene (1,4-BAAAB) into dozens of aniline derivatives, but does not mention 2-ethoxyaniline (o-phenetidine). This patent relates to processes for making all these disazo aniline derivative pigments (with a fairly complete list of possible aniline substituents, including $C_1$–$C_4$ alkoxy) in the presence of nonionic surfactants having a 5°–90° C. cloud point to give pigments suitable for printing inks.

German Offenlegungsschrift 3501199 (1985, Sandoz GmbH) relates to coupling 1,4-BAAAB into mixtures of anilines substituted with one or two carboalkoxy groups to give pigments that disperse easily into polypropylene. Canadian Patent 1135688 (1982, Hoechst AG) relates to the pigments resulting from coupling 1,4-BAAAB into anilines substituted with nitro and carboalkoxy groups. Czech Patents 188727 (1981) and 185798 (1978) relate to the pigments resulting from coupling 1,4-BAAAB into anilines substituted with urea groups. U.S. Pat. Nos. 4,146,558 and 4,103,092 to Jefferies et al relate to coupling 1,4-BAAAB into anilines substituted with quaternized aminoalkyl or aminoalkoxy groups to give water-soluble dyes. Swiss Patent 585247 (1977, Sandoz Ltd.) relates to coupling 1,4-BAAAB into an aminoquinoline derivative and heating with N,N-dimethylformamide at 140° C. to obtain a greenish yellow pigment for coloring polyvinylchloride plastics. U.S. Pat. No. 3,978,038 to Cseh et al lists 327 Examples of pigments resulting from coupling 1,4-BAAAB or various substituted 1,4-BAAABs into anilines substituted with nitro groups. U.K. Patents 1400533 and 1396526 (1975, Ciba-Geigy AG) relate to the pigments resulting from coupling 1,4-BAAAB or various substituted 1,4-BAAABs into anilines substituted with a chlorine and methyl groups or two chlorine groups. German Offenlegungsschrift 2336915 (1973, Farbwerke Hoechst AG) relates to the pigments resulting from coupling 1,4-BAAAB or various substituted 1,4-BAAABs into anilines substituted with nitro groups and other groups.

Other alternative types of azo yellows include the metallized monoazo yellows, analogous to the metallized azo red pigments that exhibit high temperature stability in plastics. C.I.Pigment Yellow 62 is a slightly redder yellow, but much weaker tinctorially than C.I. Pigment Yellow 17. Another metallized monoazo yellow, described in U.S. Pat. No. 5,669,967 to Hays, is stronger tinctorially than C.I. Pigment Yellow 17, but is an even redder yellow (though not as red as metallized medium-shade yellows C.I.Pigment Yellows 183 and 191).

Two alternative yellow pigments used by plastics processors include C.I. Pigment Yellow 109 (isoindolinone) and C.I. Pigment Yellow 138 (quinophthalone). These green-shade yellows are very close in hue to C.I. Pigment Yellow 17, but are much more expensive, much weaker and contain eight chlorine atoms per molecule, a potential environmental disadvantage. In this connection, generally speaking, the possibility of degradation into polychlorinated biphenyls (PCBs) and other dangerous compounds exists with aromatic compounds containing chlorine atoms.

Plastics processors using diarylide yellows are particularly conscious of the increased costs of using the higher concentrations of weaker yellows required for coloring plastics to the required tinctorial strengths. Although C.I. Pigment Yellow 155, a disazo pigment made from coupling 1,4-BAAAB, is available, this pigment (Sandorin 4G) is much weaker and slightly redder than C.I. Pigment Yellow 17 and shows poor heat stability (see below) at 288° C., a temperature commonly used to process polypropylene and other plastics. Thus, there is a need for new green-shade yellow azo pigments that exhibit strength comparable to C.I. Pigment Yellow 17, exhibit good heat stability and good lightfastness, and present little or no adverse environmental impact.

SUMMARY OF THE INVENTION

In one embodiment, the present invention relates to a green shade yellow pigment composition comprising a compound having the formula:

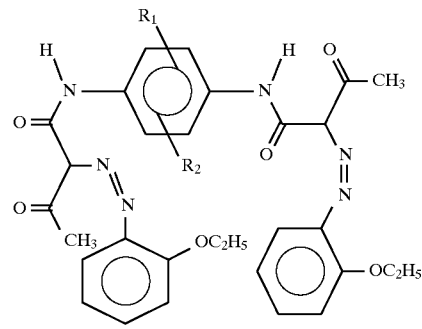

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl.

In another embodiment, the present invention relates to a method of preparing a green shade yellow pigment composition which comprises making a disazo pigment by coupling (i) a diazonium component made from one or more aromatic amines wherein at least one of said amines is 2-ethoxyaniline with (ii) at least one coupling component characterized by the formula:

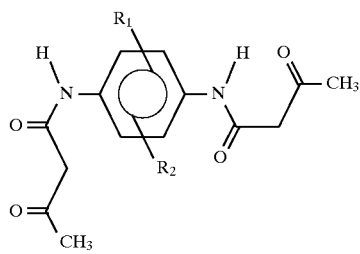

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl.

In yet another embodiment, the present invention relates to plastics, paints or inks containing disazo pigments according to the invention.

The disazo pigments according to the present invention are very surprising because one substituent, the 2-ethoxy group, is believed to impart high tinctorial and chromatic strength, good heat stability and good lightfastness.

DETAILED DESCRIPTION OF THE INVENTION

The present invention relates to green-shade yellow disazo pigments suitable for use as a coloring agent, methods of making and using the disazo pigment, and plastics, paints and inks containing the disazo pigments. Disazo pigments according to the present invention, made with an ethoxy group in the 2-position relative to the diazo group, exhibit unexpectedly high tinctorial strengths, even higher than that of C.I. Pigment Yellow 17, while simultaneously exhibiting good heat stability. In addition, the disazo pigments according to the present invention exhibit a combination of unexpectedly good heat stability and good lightfastness, in comparison to different disazo pigments with substituents other than the 2-ethoxy group. In many embodiments, the disazo pigments according to the present invention contain little (less than 2 or 1) or no halogen atoms per pigment molecule, so the disazo pigments are environmentally friendly. Since the ethoxy group is believed to impart instability through decomposition via E1 elimination of ethylene giving an easily oxidized phenolic derivative, the stability of the disazo pigments according to the present invention is unexpected.

In one embodiment, the present invention relates to coupling 1,4-bis(acetoacetamido)benzene or substituted 1,4-bis(acetoacetamido)benzene into about two equivalents of 2-ethoxyaniline (o-phenetidine) to give a disazo yellow pigment having the following chemical structure:

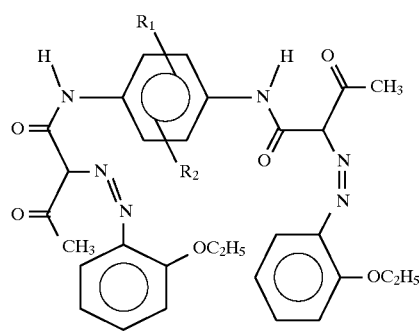

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl. In one embodiment, the disazo pigment is free of halogen atoms, and free of chlorine atomes in particular.

In a preferred embodiment, the present invention relates to coupling 1,4-bis(acetoacetamido)benzene or substituted 1,4-bis(acetoacetamido)benzene into about two equivalents of 2-ethoxyaniline (o-phenetidine) to give a disazo yellow pigment having the following chemical structure:

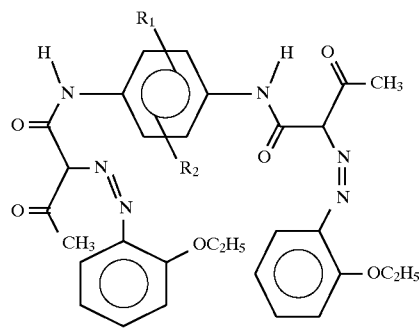

wherein $R_1$ and $R_2$ are independently hydrogen, halogen, an alkyl group having 1 to about 2 carbon atoms, an alkoxy group having 1 to about 2 carbon atoms, or an alkoxycarbonyl group having 1 to about 4 carbon atoms.

In another preferred embodiment, the coupling of 1,4-bis(acetoacetamido)into about two equivalents of 2-ethoxyaniline (o-phenetidine) provides the disazo yellow pigment having the formula:

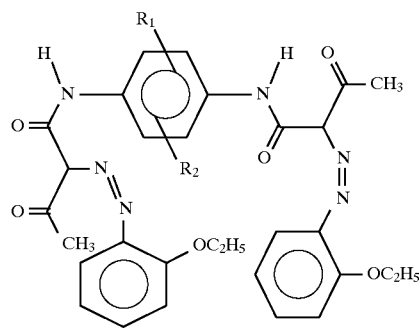

The pigments of the present invention may be prepared by initially diazotizing one or more aromatic amines wherein at least one of said amines is 2-ethoxyaniline; and thereafter coupling the diazonium component with a coupling component comprised of a bis(acetoacetamido)benzene coupler to form the desired pigment.

2-ethoxyaniline is also known as o-phenetidine. At least one of the aromatic amines is free of halogen atoms, such as chlorine atoms, and nitro groups. Mixtures of two or more aromatic amines, such as 2-ethoxyaniline and an aromatic amine that is not 2-ethoxyaniline are within the scope of this invention. Aromatic amines that are not 2-ethoxyaniline include various aniline compounds, aminobenzoate compounds, aminobenzamide compounds, anilide compounds, aminoanthraquinone compounds, benzimidazole compounds, benzimidazolone compounds, benzimidazolethione compounds, benzoxazole compounds, benzoxazolone compounds, benzothiazole compounds, benzothiazolone compounds, indazole compounds, phthalimide compounds, naphthalimide compounds, benzotriazole compounds, quinoline compounds, quinazoline compounds, quinazolinone compounds, phthalazine compounds, phthalazinone compounds, benzo-oxazinone compounds, dibenzo-phenazine compounds, quinoxalinone compounds, carbazole compounds, indole compounds, aminonaphthalene compounds, and naphthylamino compounds. The aromatic amines from which the diazonium components are prepared are available commercially or can be prepared using methods known in the art.

The diazotization of the amines useful for the purposes of this invention may be carried out in the manners known to those skilled in the art. For example, diazotization may be carried out through the use of alkali metal nitrites or lower alkyl nitrites together with an adequately strong acid such as a mineral acid. Examples of useful mineral acids include hydrochloric acid and sulfuric acid. Nitrosyl sulfuric acid also can be utilized. The diazotization reaction can be conducted at a temperature in the range of from about −20° C. to about 30° C., preferably from about 0° C. to about 20° C.

In one embodiment, it is advantageous in the diazotization reaction mixtures (and in the subsequent coupling reaction mixtures) to include one or more surface active agent such as a non-ionic, an anionic or a cationic surface active agent before, during the reaction or after the reaction is complete. In another embodiment, it is advantageous in the diazotization reactions (and in the subsequent coupling reactions) not to include a surface active agent.

In a preferred embodiment, one or more cationic surface active agents is included in the coupling reaction mixture before or during the reaction. In another preferred embodiment, one or more anionic surface-active agents is included in the coupling reaction mixture after the reaction is completed.

In one embodiment, the diazotization reaction mixture and/or the coupling reaction mixture contains from about 2 wt. % to about 10 wt. % of a surface active agent (for example, about 4 or about 8 wt %), and preferably from about 2 wt. % to about 10 wt. % of a cationic surface active agent. In another embodiment, the diazotization reaction mixture and/or the coupling reaction mixture contains from about 3 wt. % to about 9 wt. % of a surface active agent, and preferably from about 3 wt. % to about 9 wt. % of a cationic surface active agent.

In one embodiment, the diazotization reaction mixture and/or the coupling reaction mixture, during or after the reaction, contains from about 2 wt. % to about 30 wt. % of a surface active agent (for example, about 20 wt %), and preferably from about 2 wt. % to about 30 wt. % of an anionic surface active agent. In another embodiment, the diazotization reaction mixture and/or the coupling reaction mixture, during or after the reaction, contains from about 5 wt. % to about 25 wt. % of a surface active agent, and preferably from about 5 wt. % to about 25 wt. % of an anionic surface active agent.

In embodiments where one or more surface active agents are employed, anionic and/or cationic surfactants are preferred. Examples of surface active agents include amine oxide surfactants, and specifically cationic amine oxide surfactants, sulfosuccinate surfactants and derivatives thereof and specifically anionic sulfosuccinate surfactants and derivatives thereof.

Amine oxide surfactants include N,N-bis(2-hydroxyethyl)cocoalkylamine oxide, N,N-dimethylcocoalkylamine oxide, dimethyl (hydrogenated tallow) amine oxide, dimethylhexadecylamine oxide, bis(2-hydroxyethyl)tallowamine oxide, coco amidopropyl amine oxide, lauryl (12,14,16 blend) dimethyl amine oxide, myristyl dimethyl amine oxide, cocamidopropylamine oxide, and stearyl dimethylamine oxide. Examples include those under the trade designation Aromox available from Akzo Nobel Chemicals and specifically product designations C/12, C/12W, DMC, DMC-W, DMHT, DM16, and T/12; those under the trade designation Barlox® available from Lonza and specifically product designations C, 12 and 14; those under the trade designation DeMox available from DeForest Enterprises and specifically product designations CAPO and LAO; and those under the trade designation Schercamox available from Scher Chemicals and specifically product designation DMS.

Sulfosuccinate surfactants include disodium ethoxylated-alcohol half ester of sulfosuccinic acid, disodium ethoxylated nonylphenol half ester of sulfosuccinic acid, dicyclohexyl ester of sodium sulfosuccinic acid, disodium isodecyl sulfosuccinate, diamyl ester of sodium sulfosuccinic acid, dihexyl ester of sodium sulfosuccinic acid, sodium salt of sulfated nonylphenoxy polyethoxy ethanol, dioctyl ester of sodium sulfosuccinic acid, bis(tridecyl) ester of sodium sulfosuccinic acid, and disodium alkyl sulfosuccinate. Examples include those under the trade designation Aerosol available from Cytec Industries and specifically product designations A-102, A-103, A-196, A-268, AY, MA-801, NPES, OT, TR-70 and 501; those under the trade designation Geropon available from Rhone-Poulenc and specifically product designations SDS, SS-O and 99; and those under the trade designation Mackanate available from The McIntyre Group and specifically product designations DOS-70M5 and DOS-75.

In another embodiment, the sulfosuccinate surfactant is a sodium dialkylsulfosuccinate surfactant having the molecular formula:

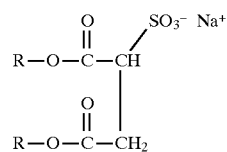

in which R is an alkyl group having from about 3 to about 20 carbon atoms and preferably from about 4 to about 13 carbon atoms.

In one embodiment, it is advantageous in the diazotization reactions (and in the subsequent coupling reactions) to include one or more appropriate organic solvents. For example, suitable organic solvents include one or more of glacial acetic acid, lower alkanols, dioxane, formamide, dimethyl formamide, dimethyl sulfoxide, pyridine or N-methyl pyrrolidone. In another embodiment, it is advantageous in the diazotization reactions (and in the subsequent coupling reactions) not to include one or more organic solvents.

Bis(acetoacetamido)benzene couplers include 1,4-bis(acetoacetamido)benzene and substituted 1,4-bis(acetoacetamido)benzenes. The bis(acetoacetamido)benzene couplers useful for the purposes of this invention are represented by the formula:

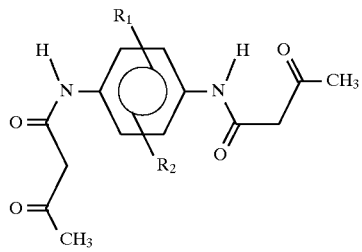

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl. Halogens include fluorine, chlorine, bromine and iodine. These compounds are known or can be synthesized using techniques known in the art.

In a preferred embodiment, the bis(acetoacetamido) benzene couplers useful for the purposes of this invention are characterized by the formula:

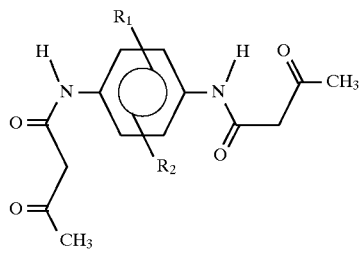

wherein $R_1$ and $R_2$ are independently hydrogen, halogen, an alkyl group having 1 to about 2 carbon atoms, an alkoxy group having 1 to about 2 carbon atoms, or an alkoxycarbonyl group having 1 to about 4 carbon atoms.

Specific examples of bis(acetoacetamido)benzene couplers include 1,4-bis(acetoacetamido)benzene; 2-chloro-1,4-bis(acetoacetamido)benzene; 2-bromo-1,4-bis(acetoacetamido)benzene; 2-trifluoromethyl-1,4-bis(acetoacetamido)benzene; 2,6-bis-trifluoromethyl-1,4-bis(acetoacetamido)benzene; 2-methoxycarbonyl-1,4-bis(acetoacetamido)benzene; 2-ethoxycarbonyl-1,4-bis(acetoacetamido)benzene; 2,5-diethoxycarbonyl-1,4-bis(acetoacetamido)benzene; 2-cyano-1,4-bis(acetoacetamido)benzene; 2-methyl-1,4-bis(acetoacetamido)benzene; 2-methoxy-1,4-bis(acetoacetamido)benzene; 2-ethyl-1,4-bis(acetoacetamido)benzene; 2-ethoxy-1,4-bis(acetoacetamido)benzene; 2-propoxy-1,4-bis(acetoacetamido)benzene; 2-isopropoxy-1,4-bis(acetoacetamido)benzene; 2-butoxy-1,4-bis(acetoacetamido)benzene; 2-phenoxy-1,4-bis(acetoacetamido)benzene; 2-nitro-1,4-bis(acetoacetamido)benzene; 2,5-dimethoxy-1,4-bis(acetoacetamido)benzene; 2,5-diethoxy-1,4-bis(acetoacetamido)benzene; 2-ethoxy-5-methoxy-1,4-bis(acetoacetamido)benzene; 2,5-dichloro-1,4-bis(acetoacetamido)benzene; 2,3-dichloro-1,4-bis(acetoacetamido)benzene; 2,6-dichloro-1,4-bis(acetoacetamido)benzene; 2,5-dibromo-1,4-bis(acetoacetamido)benzene; 2,6-dibromo-1,4-bis(acetoacetamido)benzene; 2-chloro-5-methoxy-1,4-bis(acetoacetamido)benzene; 2-chloro-5-ethoxy-1,4-bis(acetoacetamido)benzene; 2-chloro-5-methyl-1,4-bis(acetoacetamido)benzene; 2,5-dimethyl-1,4-bis(acetoacetamido)benzene; 2-methyl-5-methoxy-1,4-bis(acetoacetamido)benzene; 2-methyl-5-ethoxy-1,4-bis(acetoacetamido)benzene; 2-methyl-5-propoxy-1,4 -bis(acetoacetamido)benzene; 2-methyl-5-isopropoxy-1,4-bis(acetoacetamido)benzene; and 2-methyl-5-butoxy-1,4-bis(acetoacetamido)benzene. Mixtures of two or more of any of the bis(acetoacetamido)benzene coupler components are within the scope of this invention.

The coupling reaction useful for the purposes of the present invention may be effected preferably by adding the coupling components to diazonium components, but the diazonium components can be added to the coupling components. Coupling is generally effected at a temperature of from about −20° C. to about 80° C., preferably from about 0° C. to about 40° C. As in the diazotization reaction, coupling may be carried out in the presence or absence of an suitable surface active agent and/or organic solvent, such as all of those identified above for the diazotization reaction.

In one embodiment, the coupling component is dissolved in a basic solution such as a hydroxide solution including an aqueous alkali metal hydroxide solution and reprecipitated with a dilute acid such as acetic acid.

In another embodiment, generally, the diazonium component is coupled with a slight stoichiometric excess of the coupling component. That is, two equivalents of the diazonium component are coupled with slightly more than two equivalents of the coupling component. In one embodiment, the ratio of equivalents of the diazonium component to the coupling component is from about 1.7:2 to about 2.1:2. In another embodiment, the ratio of equivalents of the diazonium component to the coupling component is from about 1.8:2 to about 2:2 and preferably from about 1.9:2 to about 2:2.

In another embodiment of the present invention, the dispersibility of the pigments of the present invention can be improved by adding alkali-soluble resin-like products before, during, or after the coupling is completed. Various resin-like materials can be added for this purpose, and these include for example, rosin resins, polymeric rosins, resin soap, chemically modified rosin resins, such as rosin-maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions. It may also be advantageous to perform the coupling reaction in the presence of a finely divided insoluble material, for example, alkaline earth metal sulphates and carbonates, titanium dioxide or clay materials or very finely divided organic plastic materials.

In most applications, it is desirable, in order to achieve the full brightness and tinctorial strength, to heat the disazo pigment. For example, the disazo pigment may be heated to reflux temperature for about 1 to 3 hours or at temperatures above about 100° C. under pressure in the presence or absence of the above-described resin soaps or other soluble resins.

After completion of the reactions and optional heating, the disazo pigments are recovered from the water-based reaction slurry by filtering to form a presscake of pigment which is washed with hot water (e.g., from about 40° C. to about 60° C.) so as to remove the excess acids, bases and salts formed during the coupling reaction. The presscake is typically washed with from about 10 to about 20 times its volume of hot water. The filter cake is generally washed until the filtrate gives only a slightly positive test for chloride ion. The washed presscakes can be dried, ground and used in the form of a coarse or finely divided powder. Alternatively, the disazo pigments of this invention can be dispersed into oleoresinous vehicles to prepare flushed bases or dispersed into aqueous vehicles to prepare aqueous dispersions.

The pigment compositions of this invention provide strong green-shade yellow pigments having improved color strength, light fastness and/or heat stability and are useful as coloring agents in plastics, paints and inks. This invention, therefore, also relates to plastic, paint and ink compositions comprising major amounts of a plastic, paint vehicle or ink vehicle and minor amounts of the disazo pigment compositions of this invention.

The paint, ink and plastic compositions in which the compositions of this invention are useful are well known to those of ordinary skill in the art. Examples of inks include printing inks and lacquers, and examples of plastics include thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polycarbonates, polyurethanes, polyesters, for example polyglycol terephthalates, and polyacrylonitrile. It is also useful for pigment printing and for the pigmenting of paper in the mass.

Due to its excellent heat resistance, the disazo pigment is particularly suitable for the pigmenting of plastics in the mass, such as, for example, of polystyrene and its mixed polymers, polyolefins, in particular polyethylene and polypropylene and the corresponding mixed polymers and copolymers, polyvinyl chloride and polyesters in particular polyethylene terephthalate and polybutylene terephthalate and the corresponding mixed condensation products based on polyesters, and mixtures and copolymers thereof.

See, for example, with regard to ink: R. H. Leach, editor, *The Printing Ink Manual*, Fourth Edition, Van Nostrand Reinhold (International) Co. Ltd., London (1988), particularly pages 282–591; with regard to paints: C. H. Hare, *Protective Coatings*, Technology Publishing Co., Pittsburgh (1994), particularly pages 63–288; and with regard to plastics: T. G. Webber, *Coloring of Plastics*, John Wiley & Sons, New York (1979), particularly pages 79–204. The foregoing references are hereby incorporated by reference herein for their teachings of ink, paint and plastic compositions, formulations and vehicles in which the compositions of this invention may be used including amounts of colorants.

The following examples illustrate the pigments of the present invention. Unless otherwise indicated in the following examples, in the specification and in the appended claims, all parts and percentages are by weight, temperatures are in degrees centigrade and pressures are at or near atmospheric pressure.

EXAMPLE 1

A diazo solution is prepared by dissolving 13.7 parts 2-ethoxyaniline (o-phenetidine) in 25.8 parts 20° C. Baume hydrochloric acid and 200 parts hot water, icing to 0° C., adding 7.0 parts sodium nitrite dissolved in 21 parts water, stirring the solution at 0°–5° C. for 60 minutes, adding sufficient sulfamic acid to eliminate excess nitrous acid and diluting the solution to 600 parts. To the diazo solution is added a solution of 1.18 part N,N-bis(2-hydroxyethyl)-cocoalkylamine oxide and then, immediately prior to starting coupling, a solution of 7.2 parts sodium acetate dissolved in 16.8 parts water, which brings the pH to about 5.1 at 8°–10° C.

A coupler solution is prepared by dissolving 14.8 parts 1,4-bisacetoacetamidobenzene (1,4-BAAAB) in 550 parts warm water containing 4.2 parts sodium hydroxide and diluting to 600 parts. The coupler solution is pumped into the diazo solution over 18 minutes, at the end of which time the pH is 5.9 and the slurry temperature is 19° C. The pH of the slurry is raised to about 6.4 with 10% sodium hydrogen carbonate solution, at which point the slurry still shows excess diazo when tested with R-salt solution; after being stirred 30 minutes, the slurry shows no excess diazo and pH 6.6. The slurry is stirred for an hour, followed by adjusting the pH to 5.5, heating to 100° C., boiling for 30 minutes, icing to lower than 60° C. and filtering; the filtercake is washed, dried overnight at 82° C. and pulverized in an Osterizer to give 29.8 parts greenish-yellow powder.

EXAMPLE 2

The procedure of Example 1 is repeated, except that dimethyl-cocoalkylamine oxide is substituted for the bis-(2-hydroxyethyl)-cocoalkylamine oxide, giving 29.6 parts greenish-yellow powder.

EXAMPLE 3

The procedure of Example 1 is repeated, except that 2.37 parts bis-(2-hydroxyethyl)-cocoalkylamine oxide are used, giving 30.4 parts greenish-yellow powder.

EXAMPLE 4

The procedure of Example 1 is repeated, except that 2.37 parts dimethyl-cocoalkylamine oxide is substituted for the bis-(2-hydroxyethyl)-cocoalkylamine oxide, and, after coupling, a solution of 8.4 parts of a 70% solution of sodium bistridecyl sulfosuccinate dissolved in 400 parts water is added, giving 36.4 parts greenish-yellow powder.

EXAMPLE 5

The procedure of Example 1 is repeated, except that a nonionic surfactant made from $C_{11-15}$ linear alcohol and 20 moles ethylene oxide (cloud point 100° C.) is substituted for the bis-(2-hydroxyethyl)-cocoalkylamine oxide, giving 28.4 parts greenish-yellow powder.

EXAMPLE 6

The procedure of Example 1 is repeated, except that 2.37 parts of a nonionic surfactant made from $C_{12-15}$ alcohol/7 moles ethylene oxide/4 moles propylene oxide (cloud point 40°) is substituted for the bis-(2-hydroxyethyl)-cocoalkylamine oxide, giving 31.2 parts greenish-yellow powder.

Comparative Example 1

The procedure of Example 6 is used, except that 9.3 parts aniline are used in place of 2-ethoxyaniline, giving 25.2 parts greenish-yellow powder.

Comparative Example 2

The procedure of Example 6 is used, except that 12.3 parts 2-methoxyaniline are used in place of 2-ethoxyaniline, giving 29.6 parts greenish-yellow powder.

Comparative Example 3

The procedure of Example 6 is used, except that 12.1 parts 2-ethylaniline are used in place of 2-ethoxyaniline, giving 25.2 parts greenish-yellow powder.

Comparative Example 4

The procedure of Example 6 is used, except that 10.7 parts 2-methylaniline are used in place of 2-ethoxyaniline, giving 22.8 parts greenish-yellow powder.

Comparative Example 5

The procedure of Example 6 is used, except that 12.8 parts 2-chloroaniline are used in place of 2-ethoxyaniline, giving 30.4 parts greenish-yellow powder.

Comparative Example 6

The procedure of Example 6 is used, except that 17.2 parts 2-bromoaniline are used in place of 2-ethoxyaniline, giving 34.0 parts greenish-yellow powder.

Comparative Example 7

The procedure of Example 6 is used, except that 18.5 parts 2-phenoxyaniline are used in place of 2-ethoxyaniline, giving 35.6 parts greenish-yellow powder.

Comparative Example 8

The procedure of Example 6 is used, except that 16.1 parts 2-trifluoromethylaniline are used in place of 2-ethoxyaniline, giving 33.6 parts greenish-yellow powder.

Comparative Example 9

The procedure of Example 6 is used, except that 11.8 parts 2-cyanoaniline are used in place of 2-ethoxyaniline, giving 30.0 parts reddish-yellow powder.

Comparative Example 10

The procedure of Example 6 is used, except that 15.1 parts 2-carbomethoxyaniline are used in place of 2-ethoxyaniline, giving 32.4 parts greenish-yellow powder.

Comparative Example 11

The procedure of Example 6 is used, except that 13.5 parts 2-acetoaniline are used in place of 2-ethoxyaniline, giving 30.4 parts yellow powder.

Comparative Example 12

The procedure of Example 6 is used, except that 12.3 parts 4-methoxyaniline are used in place of 2-ethoxyaniline, giving 30.4 parts greenish-yellow powder.

Comparative Example 13

The procedure of Example 6 is used, except that 13.7 parts 4-ethoxyaniline are used in place of 2-ethoxyaniline, giving 31.6 parts greenish-yellow powder.

Comparative Example 14

The procedure of Example 6 is used, except that 10.7 parts 4-methylaniline are used in place of 2-ethoxyaniline, giving 29.2 parts greenish-yellow powder.

Comparative Example 15

The procedure of Example 6 is used, except that 12.8 parts 4-chloroaniline are used in place of 2-ethoxyaniline, giving 30.8 parts greenish-yellow powder.

During the testing of pigments, the standard pigment, to which the experimental pigments are compared, is a green-shade diarylide yellow (C.I. Pigment Yellow 17) used in plastics under product designation RX1276 available from Engelhard.

Several commercial green-shade yellow pigments are included for comparison: Sandorin Yellow 4G (C.I. Pigment Yellow 155), which is a commercial example of this type of disazo pigment made with 1,4-bisacetoacetamidobenzene (1,4-BAAAB) available from Sandoz; Permanent Yellow NCG-71 (C.I. Pigment Yellow 16), which is another kind (different) of disazo pigment (made with bisacetoacetylated 3,3'-dimethylbenzidine) available from Hoechst; Yellow 2GLTE (C.I. Pigment Yellow 109), an isoindolinone pigment available from Ciba; and Paliotol Yellow K 0961 HD (C.I. Pigment Yellow 138), a quinophthalone pigment available from BASF.

For comparing tinctorial strength and other coloristic values, the pigments are tested initially as 1:1 (0.1 phr pigment: 0.1 phr titanium dioxide) tints in high density polyethylene injection molded chips, as follows: A mixture of 0.500 part pigment, 0.500 part titanium dioxide and 500 parts high density polyethylene (Solvay T50-2000-G) is shaken on a paint shaker for 15 seconds, then injection molded at 232° C. for 1.5 minutes in a 30 ton Battenfeld machine. Spectrophotometric values of the molded chips are measured with a Macbeth Color-Eye (specular component included, large area) to give K/S apparent strength versus the standard pigment and CIE L*C*h chroma, hue angle and lightness under Illuminant D, 10 degrees, as shown in Table I. To obtain a better measure of the tinctorial strengths, the strongest of the Experimental pigments is then tested in a reduced tint as 0.50:1 (50% reduction in pigment content) by repeating this procedure, except that 0.250 part pigment is used in place of the 0.500 part pigment; the K/S apparent strength and CIE L*C*h chroma, hue angle and lightness under Illuminant D, 10 degrees, of this reduced tint are measured against a 1:1 tint of RX1276 and are shown in Table II. To obtain a better measure of the tinctorial strengths, the strongest of the Experimental pigments is then tested in a reduced tint as 0.30:1 (70% reduction in pigment content) by repeating this procedure, except that 0.150 part pigment is used in place of the 0.500 part pigment; the K/S apparent strength and CIE L*C*h chroma, hue angle and lightness under Illuminant D, 10 degrees, of this reduced tint are measured against a 1:1 tint of Paliotol Yellow K 0961 HD (C.I. Pigment Yellow 138) and are shown in Table III. To obtain another comparison of tinctorial strengths, the strongest of the Experimental pigments is then tested in a reduced tint as a 0.20:1 tint (80% reduction in pigment content) by repeating this procedure, except that 0.100 part pigment is used in place of the 0.500 part pigment; the K/S apparent strength and CIE L*C*h chroma, hue angle and lightness under Illuminant D, 10 degrees, of this reduced tint are measured against a 1:1 tint of Yellow 2GLTE (C.I. Pigment Yellow 109) and are shown in Table IV.

For comparing heat stabilities, the pigments are tested as above for coloristic values of 1:1 tints, except that the chips are molded and held at 288° for 3 minutes. Spectrophotometric values of the molded chips are measured with a Macbeth Color-Eye (specular component included, large area) versus the chips molded at 232° to give CIELab delta E values, as shown in Table V.

For comparing fade resistance, the high density polyethylene injection molded 1:1 tint chips used for coloristic values are exposed for 100 hours in an Atlas Xenon Fade-Ometer. Spectrophotometric values of the exposed chips are measured with a Macbeth Color-Eye (specular component included, large area) versus unexposed chips to give CIELab delta E values, as shown in Table V.

For comparing apparent strength and hue angles in a paint vehicle, the standard pigment and the pigments of Examples 1 and 4 are tested as 1:1 tints as follows: A mixture of 0.50 part pigment, 0.50 parts titanium dioxide (DuPont Ti-Pure R-960), 23.2 parts air-dry alkyd enamel vehicle (containing 86% medium oil alkyd, 13% mineral spirits and 1% driers/antiskinning agent) and 75 parts media (Zircoa Zirbeads Y1304) is stirred with a spatula to a uniform mixture, sealed with a lid and shaken on a paint shaker for 30 minutes. The dispersion is separated from the media, drawn down with a 0.15 mm. gap coating bar on coated cardboard (Leneta Form 2-C) and allowed to dry for 1–2 days. Spectrophotometric values are measured with a Macbeth Color-Eye (specular component included, large area) to give the apparent strength and hue angles under Illuminant D, 10 degrees, shown in Table VI.

TABLE I

Coloristic Values of 1:1 Tints in HDPE

| Pigment | Apparent Strength | Chroma (C*) | Hue Angle (h) | Lightness (L*) |
|---|---|---|---|---|
| P.Y 17 | Standard (K/S = 23.655) | 89.9 | 90.3° | 88.4 |
| Example 1 (2-ethoxy) | +23% (K/S = 29.164) | 91.6 | 91.2° | 87.6 |
| Example 2 (2-ethoxy) | +21% | 92.2 | 91.4° | 88.1 |
| Example 3 (2-ethoxy) | +16% | 91.1 | 91.9° | 88.1 |
| Example 4 (2-ethoxy) | +20% | 92.4 | 92.3° | 89.0 |
| Example 5 (2-ethoxy) | +23% | 90.9 | 90.7° | 87.3 |
| Example 6 (2-ethoxy) | +19% | 89.7 | 90.1° | 86.6 |
| Com. Ex. 1 (no substituents) | −19% | 78.4 | 95.5° | 89.3 |
| Com. Ex. 2 (2-methoxy) | +20% | 89.3 | 91.4° | 87.2 |
| Com. Ex. 3 (2-ethyl) | −6% | 81.5 | 88.9° | 85.5 |
| Com. Ex. 4 (2-methyl) | +1% | 84.2 | 89.3° | 85.8 |
| Com. Ex. 5 (2-chloro) | −4% | 84.0 | 87.1° | 85.8 |
| Com. Ex. 6 (2-bromo) | −4% | 84.9 | 89.0° | 87.0 |
| Com. Ex. 7 (2-phenoxy) | Equal | 83.6 | 92.4° | 88.3 |
| Com. Ex. 8 (2-trifluoromethyl) | −27% | 78.4 | 89.6° | 87.3 |
| Com. Ex. 9 (2-cyano) | +10% | 70.1 | 72.3° | 74.1 |
| Com. Ex. 10 (2-carbomethoxy) | −10% | 82.6 | 89.0° | 87.1 |
| Com. Ex. 11 (2-aceto) | +9% | 80.6 | 78.7° | 80.8 |
| Com. Ex. 12 (4-methoxy) | +20% | 83.9 | 86.3° | 82.3 |
| Com. Ex. 13 (4-ethoxy) | +16% | 84.8 | 87.9° | 83.8 |
| Com. Ex. 14 (4-methyl) | −4% | 81.8 | 91.2° | 86.6 |
| Com. Ex. 15 (4-chloro) | −1% | 86.0 | 90.0° | 87.2 |
| C.I. P.Y. 155 (2,5-dicarbomethoxy) | −13% | 82.1 | 88.3° | 86.0 |
| C.I. Pigment Yellow 16 | +2% | 87.5 | 90.9° | 88.4 |
| C.I. Pigment Yellow 138 | −18% | 84.3 | 93.5° | 89.4 |
| C.I. Pigment Yellow 109 | −39% | 77.9 | 93.6° | 89.7 |

In Table I, the apparent strengths of the Examples, all containing the 2-ethoxy substituent and made with different surfactants, are estimated to be 16–23% stronger than P.Y. 17 in 1:1 tints; even though the pigment of Example 4 is diluted about 20% with surfactant, it maintains its apparent strength and chroma. The hue angles of the Example tints are generally slightly higher (slightly greener) than the P.Y. 17 tint. The apparent strengths of several Comparative Examples (C.E.), containing no substituent or substituents other than 2-ethoxy, are equal to 20% stronger than P.Y. 17; however, the chroma and lightness values indicate that, except for C.E. 2, these Comparative Examples obtain their apparent strengths not from strong chromas, but from lower lightness (dirtiness). Pigment Yellow 155 (Sandorin Yellow 4G), which is like the Comparative Examples and contains carbomethoxy groups at the 2- and 5- position, is 13% weaker and slightly redder than P.Y. 17. Pigment Yellow 16 (Permanent Yellow NCG-71), which is another kind of disazo yellow (made with bisacetoacetylated 3,3'-dimethylbenzidine), is about equal in strength and hue, but shows lower chroma. Also, for comparison, P.Y. 138 (Paliotol Yellow K 0961 HD), is 18% weaker and somewhat greener than P.Y. 17; P. Y. 109 (Irgazin Yellow 2GLTE) is 39% weaker and somewhat greener than P.Y. 17.

When the apparent strengths or weaknesses in Table I are greater than about 10%, they tend to be underestimated, as demonstrated in the following Tables.

TABLE II

Coloristic Values of a 0.5:1 Tint in HDPE

| Pigment | Apparent Strength | Chroma (C*) | Hue Angle (h) | Lightness (L*) |
|---|---|---|---|---|
| P.Y 17 (1:1) | Standard (K/S = 23.080) | 89.8 | 90.4° | 88.7 |
| Example 1 (0.5:1) | +5% (K/S = 24.144) | 89.3 | 93.8° | 89.4 |

In Table II, the apparent strength of Example 1, coupled in the presence of 5% N,N-bis(2-hydroxyethyl)-cocoalkylamine oxide, is estimated to be +5% in a 0.5:1 tint; this means that Example 1 is more than 100% stronger than P.Y. 17. Although the apparent strength, chroma and lightness values for the 0.5:1 tint of Example 1 are close to those of 1:1 P.Y. 17, the hue angle for the 0.5:1 tint of Example 1 is significantly higher (greener), which distinguishes it from 1:1 P.Y. 17.

TABLE III

Coloristic Values of a 0.3:1 Tint in HDPE

| Pigment | Apparent Strength | Chroma (C*) | Hue Angle (h) | Lightness (L*) |
|---|---|---|---|---|
| P.Y 138 (1:1) | Standard (K/S = 18.959) | 84.3 | 93.5° | 89.3 |
| Example 1 (0.3:1) | +4% (K/S = 19.664) | 83.8 | 94.1° | 89.3 |

In Table III, the apparent strength of Example 1, coupled in the presence of 5% N,N-bis(2-hydroxyethyl)-cocoalkylamine oxide, is estimated to be +4% in 0.3:1 tint; this means that Example 1 is more than 3.3 times stronger than P.Y. 138. The chroma, hue angle and lightness values for the 0.3:1 tint of Example 1 indicate that it is a good match for 1:1 P.Y. 138.

TABLE IV

Coloristic Values of a 0.2:1 Tint in HDPE

| Pigment | Apparent Strength | Chroma (C*) | Hue Angle (h) | Lightness (L*) |
|---|---|---|---|---|
| P.Y 109 (1:1) | Standard (K/S = 14.155) | 77.9 | 93.8° | 89.7 |
| Example 1 (0.2:1) | +10% (K/S = 15.519) | 79.2 | 96.3° | 90.4 |

In Table IV, the apparent strength of Example 1, coupled in the presence of 5% N,N-bis(2-hydroxyethyl)-cocoalkylamine oxide, is estimated to be +10% in 0.2:1 tint; this means that Example 1 is more than 5 times stronger than P.Y. 109. The apparent strength, chroma and hue angle for the 0.2:1 tint of Example 1 are higher than those of 1:1 P.Y. 109, which distinguishes the 0.2:1 tint of Example 1 from 1:1 P.Y. 109.

TABLE V

Change (Delta E) in Coloristic Values of 1:1 Tints in HDPE After:

| Pigment | Heat Stability Testing | Fade Resistance Testing |
|---|---|---|
| P.Y. 17 | 1.5 | 1.4 |
| Example 1.(2-ethoxy) | 2.0 | 1.2 |
| Example 2 (2-ethoxy) | 0.9 | 1.9 |
| Example 3 (2-ethoxy) | 1.5 | 0.7 |
| Example 4 (2-ethoxy) | 1.7 | 0.8 |
| Example 5 (2-ethoxy) | 1.3 | 2.1 |
| Example 6 (2-ethoxy) | 2.0 | 1.3 |
| Comparative Example 1 (no subst.) | 24.0 | 5.8 |
| Comparative Example 2 (2-methoxy) | 12.1 | 3.1 |
| Comparative Example 3 (2-ethyl) | 3.5 | 6.4 |
| Comparative Example 4 (2-methyl) | 1.0 | 7.5 |
| Comparative Example 5 (2-chloro) | 2.2 | 2.4 |
| Comparative Example 6 (2-bromo) | 4.3 | 2.3 |
| Comparative Example 7 (2-phenoxy) | 6.4 | 1.9 |
| Comparative Example 8 (2-trifluoromethyl) | 12.9 | 3.2 |
| Comparative Example 9 (2-cyano) | 23.2 | 2.9 |
| Comparative Example 10 (2-carbomethoxy) | 11.0 | 2.0 |
| Comparative Example 11 (2-aceto) | 16.7 | 4.7 |
| Comparative Example 12 (4-methoxy) | 6.8 | 9.0 |
| Comparative Example 13 (4-ethoxy) | 4.1 | 12.8 |
| Comparative Example 14 (4-methyl) | 2.8 | 2.7 |
| Comparative Example 15 (4-chloro) | 3.7 | 2.5 |
| C.I. Pigment Yellow 155 (2,5-dicarbomethoxy) | 19.5 | 1.5 |
| C.I. Pigment Yellow 16 | 7.0 | 0.8 |
| C.I. Pigment Yellow 138 | 3.6 | 1.1 |
| C.I. Pigment Yellow 109 | 0.4 | 0.5 |

In Table V, the delta Es (a measure of change) for the heat stabilities of the Examples are about the same as for P.Y. 17 and are at or lower than the delta E=2.0, typically considered to be the upper limit for concern by plastics processors. The delta Es for the fade resistances of the Examples range from 0.7 to 2.1, with four of them being lower than the 1.4 of P.Y. 17, which is considered to have fairly good fade resistance (W. Herbst and K. Hunger, ibid, p. 252, state:. "P.Y.17 is almost as lightfast as the somewhat redder P.Y.13 (step 6–7 at 1/3 SD).").

In Table V, the delta Es for the heat stabilities of the Comparative Examples (except for the acceptable 1.0 of Comparative Example 4, with the 2-methyl substituent) range from marginal (Comparative Example 5, with the 2-chloro substituent) to extremely poor (Comparative Examples 1 and 9, with no substituent and the 2-cyano substituent). The delta Es for the fade resistances of the Comparative Examples range from a marginal 1.9 (Comparative Example 7, with a 2-phenoxy substituent) to a very poor 12.8 (Comparative Example 13, with the 4-ethoxy substituent). The delta Es for the heat stabilities of the commercial green-shade yellow pigments range, with the exception of P.Y. 109, from poor for P.Y. 138 to very poor for P.Y. 155. The delta Es for the fade resistances of the commercial green-shade yellow pigments are good (1.1; 1.5) to very good (0.5; 0.8).

TABLE VI

Coloristic Values of 1:1 Tints in Air-Dry Enamel

| Pigment | Apparent Strength | Chroma (C*) | Hue Angle (h) | Lightness |
|---|---|---|---|---|
| P.Y. 17 | Standard (K/S = 30.261) | 90.4 | 86.6° | 84.8 |
| Example 1 | −7% | 88.5 | 87.9° | 85.0 |
| Example 4 | −6% | 90.6 | 89.7° | 86.5 |

In Table VI, Example 1 is about 7% weaker and shows lower chroma than P.Y. 17 in 1:1 tints in air-dry enamel. This weakness is surprising in light of the strength of Example 1 in HDPE and may arise from poorer dispersibility of Example 1 in air-dry enamel. Example 4, which is post-treated with 20% sodium bistridecyl sulfosuccinate, is also slightly weak; however, its chroma is as high as that of P.Y. 17, indicating better dispersibility in air-dry enamel, so its lower apparent strength probably derives from its higher lightness. The hue angles of the Examples tint are higher (greener) than that of the P.Y. 17 tint.

When incorporated in polyolefins, the pigments obtained according to the present invention display strong, bright greenish shade yellows in contrast to the generally weaker shades displayed by conventional pigments. The relatively high chromaticity values are consistent with the brightness of the color displayed while the high strength is reflected by a relatively high K/S values.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A green shade yellow pigment composition comprising a compound having the formula:

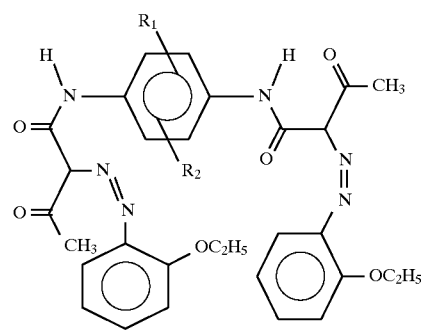

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl.

2. A composition according to claim 1, wherein at least one of $R_1$ and $R_2$ is an alkyl group containing from 1 to about 2 carbon atoms.

3. A composition according to claim 1, wherein $R_1$ and $R_2$ are hydrogen.

4. A composition according to claim 1, wherein at least one of $R_1$ and $R_2$ is a halogen.

5. A composition according to claim 4, wherein the halogen is chlorine.

6. A composition according to claim 1 further comprising a cationic amine oxide surfactant.

7. A composition according to claim 1 further comprising an anionic sulfosuccinate surfactant.

8. A green shade yellow pigment composition comprising one or more compounds characterized by the formula:

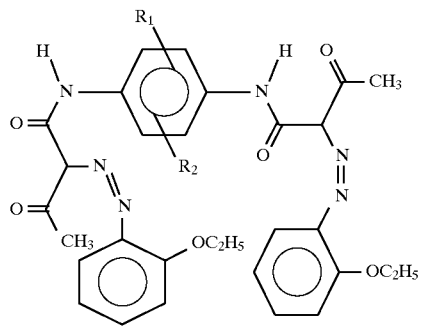

wherein $R_1$ and $R_2$ are independently hydrogen, halogen, an alkyl group having 1 to about 2 carbon atoms, an alkoxy group having 1 to about 2 carbon atoms, or an alkoxycarbonyl group having 1 to about 4 carbon atoms.

9. A composition according to claim 8, wherein at least one of $R_1$ and $R_2$ is hydrogen.

10. A composition according to claim 8 further comprising at least one surfactant selected from N,N-bis(2-hydroxyethyl)cocoalkylamine oxide and N,N-dimethylcocoalkylamine oxide.

11. A composition according to claim 1 further comprising bis(tridecyl) ester of sodium sulfosuccinic acid.

12. A method of preparing a green shade yellow pigment composition which comprises making a disazo pigment by coupling (i) a diazonium component made from of one or more aromatic amines wherein at least one of said amines is 2-ethoxyaniline with (ii) at least one coupling component characterized by the formula:

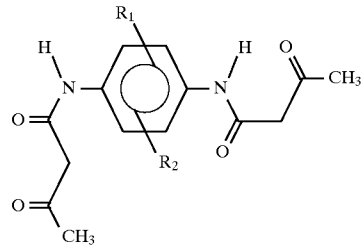

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl.

13. A method according to claim 12 wherein (i) and (ii) are coupled in the presence of at least one surfactant selected from N,N-bis(2-hydroxyethyl)cocoalkylamine oxide and N,N-dimethylcocoalkylamine oxide.

14. A method according to claim 12 further comprising adding bis(tridecyl) ester of sodium sulfosuccinic acid.

15. A method according to claim 12 wherein the ratio of equivalents of (i) to (ii) is from about 1.7:2 to about 2.1:2.

16. A method according to claim 12 wherein $R_1$ and $R_2$ are hydrogen.

17. A composition prepared according to the method of claim 12.

18. A composition prepared according to the process of claim 16.

19. A paint composition comprising a paint vehicle and the composition of claim 1.

20. A paint composition comprising a paint vehicle and the composition of claim 17.

21. An ink composition comprising an ink vehicle and the composition of claim 1.

22. An ink composition comprising an ink vehicle and the composition of claim 17.

23. A plastic composition comprising a plastic material and the composition of claim 1.

24. A plastic composition comprising a plastic material and the composition of claim 17.

* * * * *